United States Patent
Hunt et al.

(10) Patent No.: US 10,855,605 B2
(45) Date of Patent: Dec. 1, 2020

(54) THROTTLING TO CONTROL THERMAL PROPERTIES THROUGH A NODE

(71) Applicant: Silver Spring Networks, Inc., Redwood City, CA (US)

(72) Inventors: Peter Hunt, Sunnyvale, CA (US); Jana van Greunen, Woodside, CA (US); Will E. San Filippo, III, Los Altos Hills, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 1530 days.

(21) Appl. No.: 14/516,293

(22) Filed: Oct. 16, 2014

(65) Prior Publication Data

US 2015/0105932 A1      Apr. 16, 2015

Related U.S. Application Data

(60) Provisional application No. 61/891,698, filed on Oct. 16, 2013.

(51) Int. Cl.
| | |
|---|---|
| *H04L 12/825* | (2013.01) |
| *H04L 12/851* | (2013.01) |
| *H04L 12/927* | (2013.01) |
| *H04L 12/841* | (2013.01) |
| *G06F 1/20* | (2006.01) |
| *H04L 12/917* | (2013.01) |

(52) U.S. Cl.
CPC .............. *H04L 47/25* (2013.01); *G06F 1/206* (2013.01); *H04L 47/24* (2013.01); *H04L 47/28* (2013.01); *H04L 47/76* (2013.01); *H04L 47/805* (2013.01)

(58) Field of Classification Search
CPC ....... H04L 47/25; H04L 47/24; H04L 47/805; H04L 47/28; H04L 47/76; G06F 1/206
See application file for complete search history.

(56) References Cited

U.S. PATENT DOCUMENTS

| | | | |
|---|---|---|---|
| 6,718,164 B1* | 4/2004 | Korneluk | H03F 1/30 219/208 |
| 2002/0091475 A1* | 7/2002 | Hashimoto | B60L 3/12 701/48 |
| 2013/0073096 A1* | 3/2013 | Brey | G05B 13/02 700/282 |

* cited by examiner

Primary Examiner — Mohammad Ali
Assistant Examiner — Sheela Rao
(74) Attorney, Agent, or Firm — Artegis Law Group, LLP

(57) ABSTRACT

The invention relates to a method for controlling thermal properties of a node. The method steps include calculating, using a temperature reading, a transmission duty cycle of the node, calculating a data amount capable of being transmitted with the transmission duty cycle, and transmitting, from a network interface of the node, a plurality of available data at a rate less than the data amount based on a priority of the plurality of available data.

20 Claims, 7 Drawing Sheets

THROTTLING TO CONTROL THERMAL PROPERTIES THROUGH A NODE

CROSS-REFERENCE TO RELATED APPLICATIONS

This application claims priority, pursuant to 35 U.S.C. § 119(e), to U.S. Provisional Application No. 61/891,698, filed on Oct. 16, 2013, the entirety of which is incorporated by reference herein.

BACKGROUND

Many systems that transmit data over a network generate heat when the data is transmitted. Over time, the heat generated can accumulate and affect the systems. Reducing the heat generated by data transmission can enhance the operations of such systems. Further, a system that transmits data over a network often transmits data of varying priorities. Prioritizing certain types of data transmission over others may be necessary when the system suffers degradation caused by overheating, extreme network traffic, and/or other factors.

SUMMARY

In general, in one aspect, the invention relates to a method for controlling thermal properties of a node. The method steps include calculating, using a temperature reading, a transmission duty cycle of the node, calculating a data amount capable of being transmitted with the transmission duty cycle, and transmitting, from a network interface of the node, a plurality of available data at a rate less than the data amount based on a priority of the plurality of available data.

In general, in one aspect, the invention relates to a system for controlling thermal properties of a node. The system includes a transmission network, a server and the node operatively connected to the server via the transmission network, wherein the node includes a first processor configured to calculate, using a temperature reading, a transmission duty cycle of the node, calculate a data amount capable of being transmitted with the transmission duty cycle, and transmit, from a network interface of the node, a plurality of available data at a rate less than the data amount based on a priority of the plurality of available data.

In general, in one aspect, the invention relates to a non-transitory computer readable medium embodying instructions executable by the computer to perform method steps to control thermal properties of a node. The instructions include functionality to calculate, using a temperature reading, a transmission duty cycle of the node, calculate a data amount capable of being transmitted with the transmission duty cycle, and transmit, from a network interface of the node, a plurality of available data at a rate less than the data amount based on the priority of the plurality of the available data.

Other aspects and advantages of the invention will be apparent from the following description and the appended claims.

DETAILED DESCRIPTION

Figure 1:
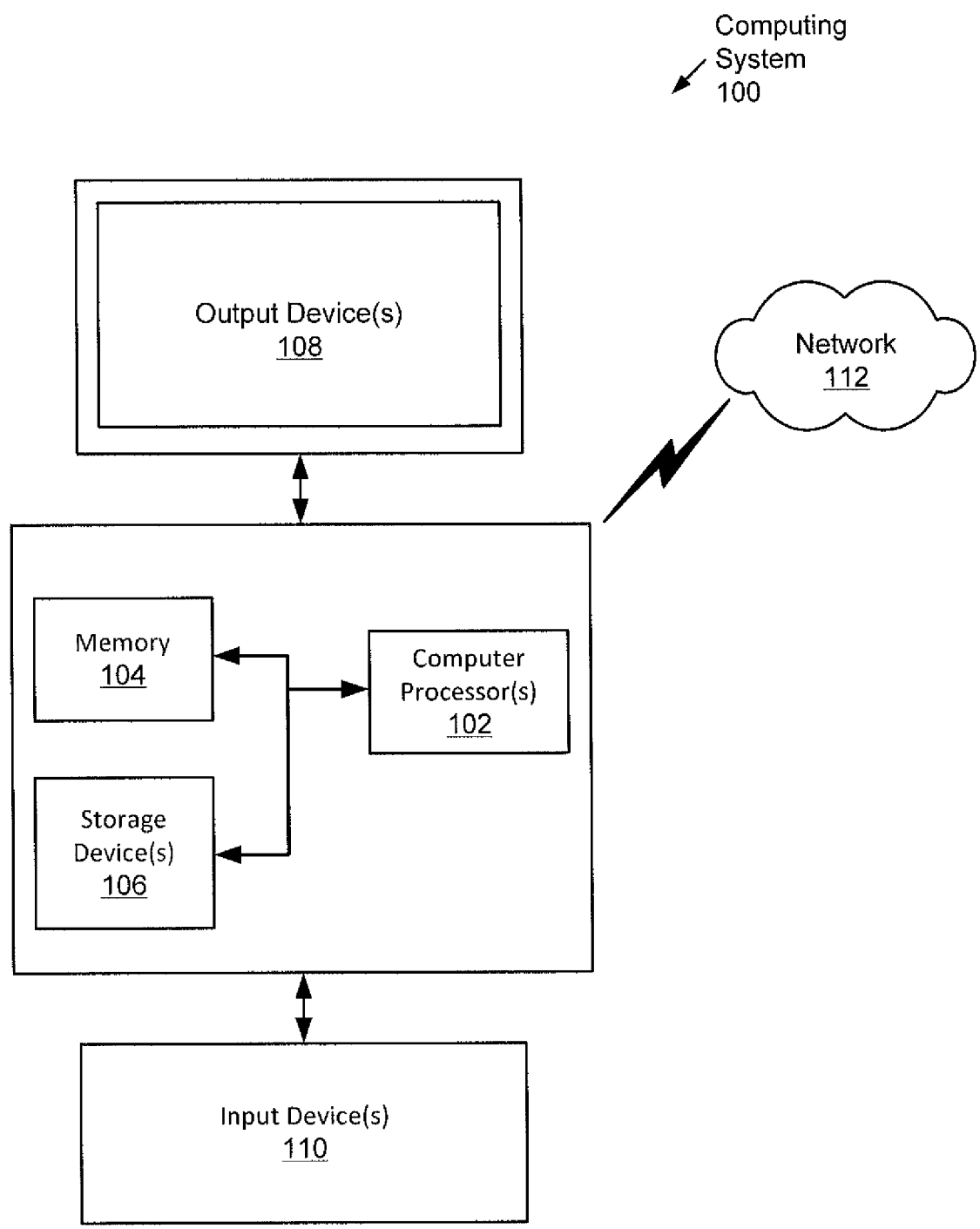
FIGS. 1-3 show schematic system diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system where transmission of available data is controlled in an effort to control the thermal properties of the system. Specifically, one or more embodiments of the invention provide a method, system, and computer readable medium for controlling thermal properties of a node. The nodes, or the servers connected to the nodes over a transmission network, calculate the amount and/or rate of available data that may be transmitted over the transmission network based on a temperature reading at one or more points in the system. Available data is transmitted based on the priority of the available data.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

For example, as shown in FIG. 1, the computing system (100) may include one or more computer processor(s) (102), associated memory (104) (e.g., random access memory (RAM), cache memory, flash memory, etc.), one or more storage device(s) (106) (e.g., a hard disk, an optical drive such as a compact disk (CD) drive or digital versatile disk (DVD) drive, a flash memory stick, etc.), and numerous other elements and functionalities. The computer processor(s) (102) may be an integrated circuit for processing instructions. For example, the computer processor(s) may be one or more cores, or micro-cores of a processor. The computing system (100) may also include one or more input device(s) (110), such as a touchscreen, keyboard, mouse, microphone, touchpad, electronic pen, or any other type of input device. Further, the computing system (100) may include one or more output device(s) (108), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (100) may be connected to a network (112) (e.g., a local area network (LAN), a wide area network (WAN) such as the Internet, mobile network, or any other type of network) via a network interface connection (not shown). The input and output device(s) may be locally or remotely (e.g., via the network (112)) connected to the computer processor(s) (102), memory (104), and storage device(s)

(106). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (100) may be located at a remote location and connected to the other elements over a network (112). Further, one or more embodiments of the invention may be implemented on a distributed system having a plurality of components, where each portion of the invention may be located on a different component within the distributed system. In one embodiment of the invention, the component corresponds to a distinct computing device. Alternatively, the component may correspond to a computer processor with associated physical memory. The node may alternatively correspond to a computer processor or micro-core of a computer processor with shared memory and/or resources.

Figure 2A:
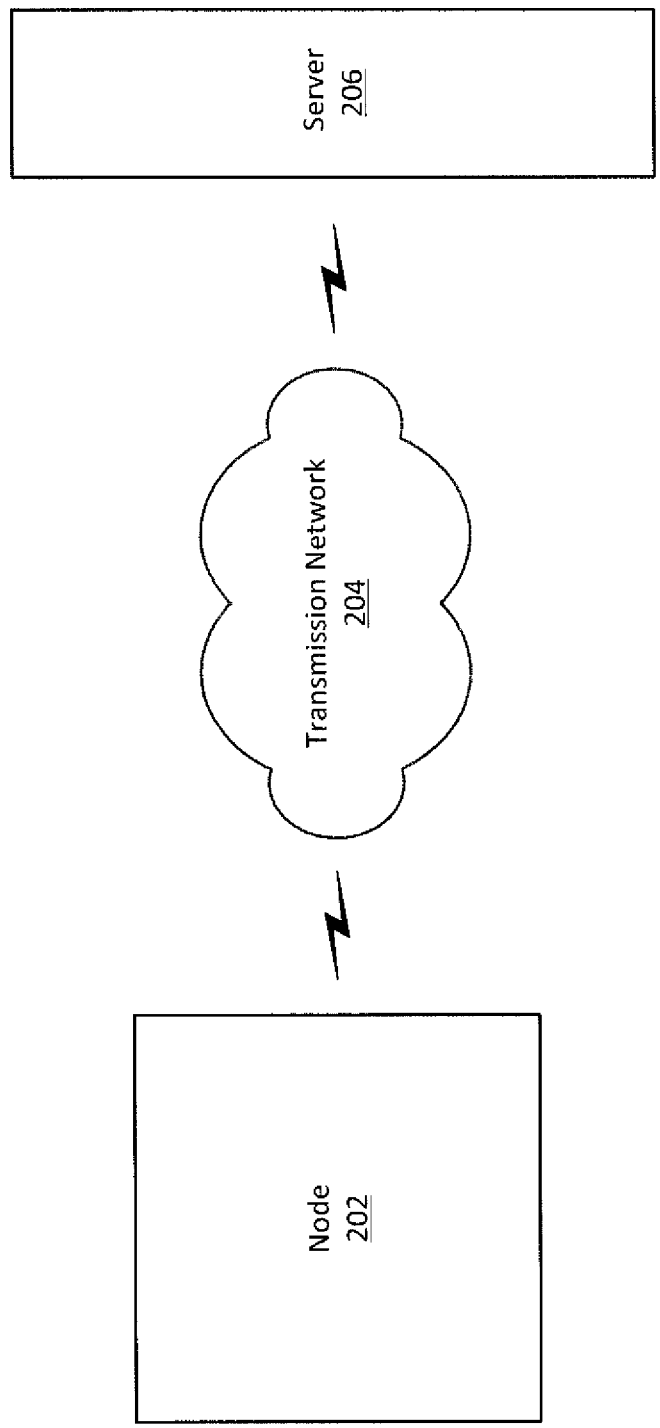

FIG. 2A shows a diagram in accordance with one or more embodiments of the invention. One or more embodiments contain a node (202), a transmission network (204), and a server (206). The node (202) is operatively connected to the server (206) via the transmission network (204). Each of these components is further described below.

In one or more embodiments of the invention, the node (202) is a computing device (e.g., personal computer, embedded system, system on chip, system on module, etc.) that may send/receive available data to/from the server (206) via the transmission network (204). The node (202) is further described in connection with FIG. 3.

In one or more embodiments of the invention, the transmission network (204) is a set of communications hardware and/or software (e.g., a cellular data network, an 802.11 WiFi network, a wired Ethernet network, a satellite network, an IPv6 network, etc.) (WiFi is a registered trademark of Wi-Fi Alliance, Austin, Tex., USA) that may send available data between the node (202) and the server (206).

In one or more embodiments of the invention, the server (206) is a computing device (e.g., dedicated server, personal computer, cloud service, etc.) that may send/receive available data to/from the node (202) via the transmission network (204). The server (206) may be used to monitor the node (202) (e.g., check status of the node, ascertain temperature reading at the node, send various commands or requests to the node, etc.). Although the transmission network (204) may not need centralized control, the server (206) may also be used to perform control functions (e.g., change network settings, change network protocol, etc.).

Figure 2B:
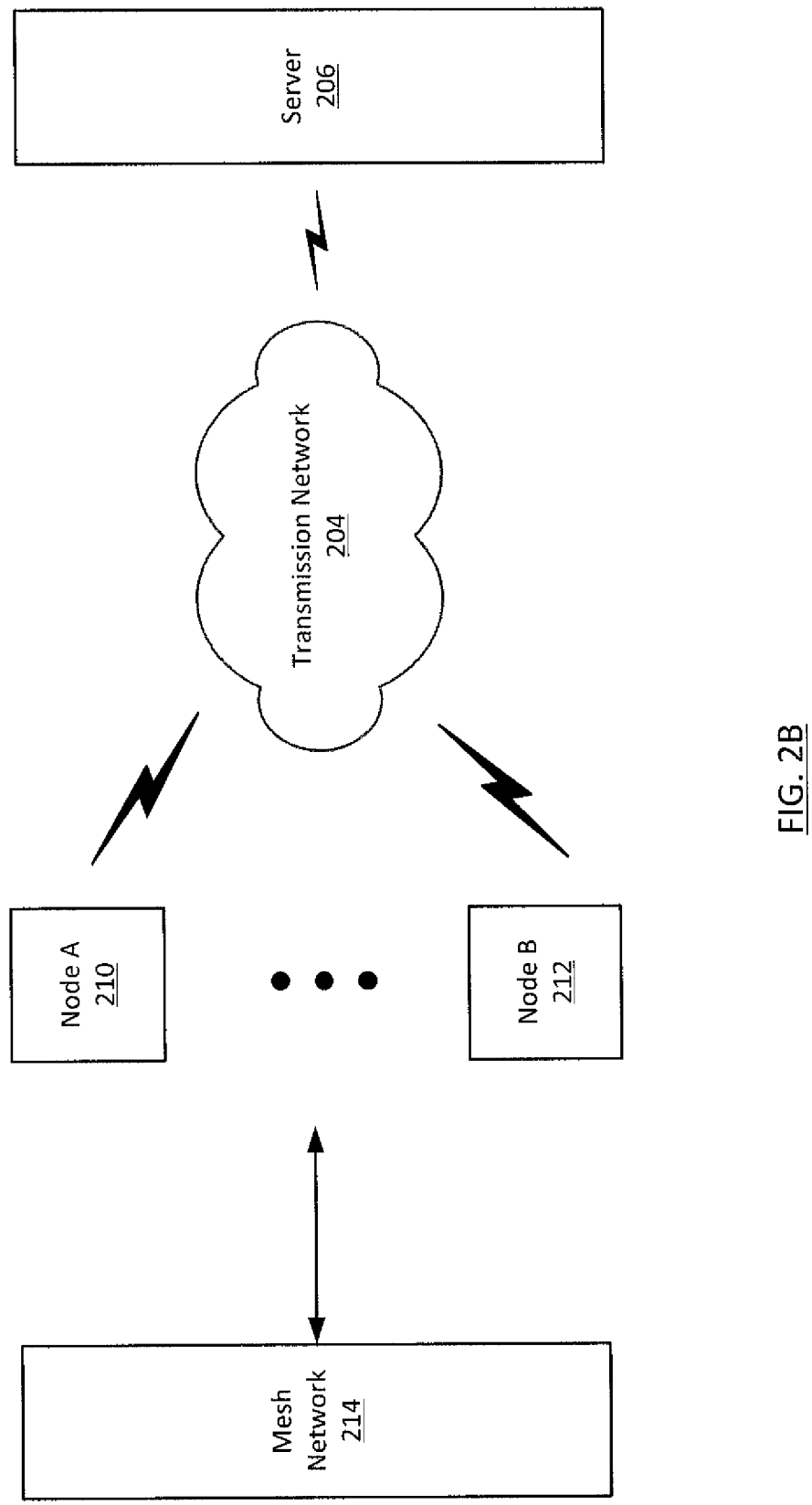

FIG. 2B shows a diagram in accordance with one or more embodiments of the invention. The diagram contains numerous nodes (node A (210) and node B (212)), a transmission network (204), a server (206), and a mesh network (214). In one embodiment, one or more nodes are operatively connected to a second node or additional nodes via the mesh network (214). In one embodiment, one or more nodes are operatively connected to the server (206) via the transmission network (204). Each of these components is further described below.

In one or more embodiments of the invention, each node is a computing device (e.g., personal computer, embedded system, system on chip, system on module, etc.). In one or more embodiments, one or more nodes interfacing with the mesh network (214) may send/receive available data to/from the server (206) via the transmission network (204). In one or more embodiments, one or more nodes within the various nodes may send/receive available data to/from one or more other nodes via the mesh network (214). An exemplary node is further described in connection with FIG. 3.

In one or more embodiments of the invention, the mesh network (214) includes one or more nodes connected over a wireless network protocol (e.g., ZigBee, Bluetooth). (ZigBee is a registered trademark of ZigBee Alliance, Inc., San Ramon, Calif., USA. BLUETOOTH is a registered trademark of Bluetooth SIG, Inc., Kirkland, Wash., USA). The mesh network (214) may route data transmitted by one node of the numerous nodes to one or more other nodes. While a mesh network (214) is shown, one of skill in the art could appreciate that a single controlling node (202) could function in the capacity of the mesh network (214) in one or more embodiments of the invention.

In one or more embodiments of the invention, the nodes (e.g., node A (210), node B (212)) operatively connected to mesh network (214) are responsible for not only sending and receiving available data pertaining to said node, but also for routing available data from other sources (e.g., other nodes) to other destinations (e.g., transmission network (204)). Those skilled in the art will appreciate that this configuration allows the mesh network (214) and communication among the nodes connected to the mesh network (214) to function without centralized control. Further, the mesh network (214) is capable of functioning if a node or a link between two nodes exhibit failure, as there may be multiple paths from any source to any destination.

Figure 3:
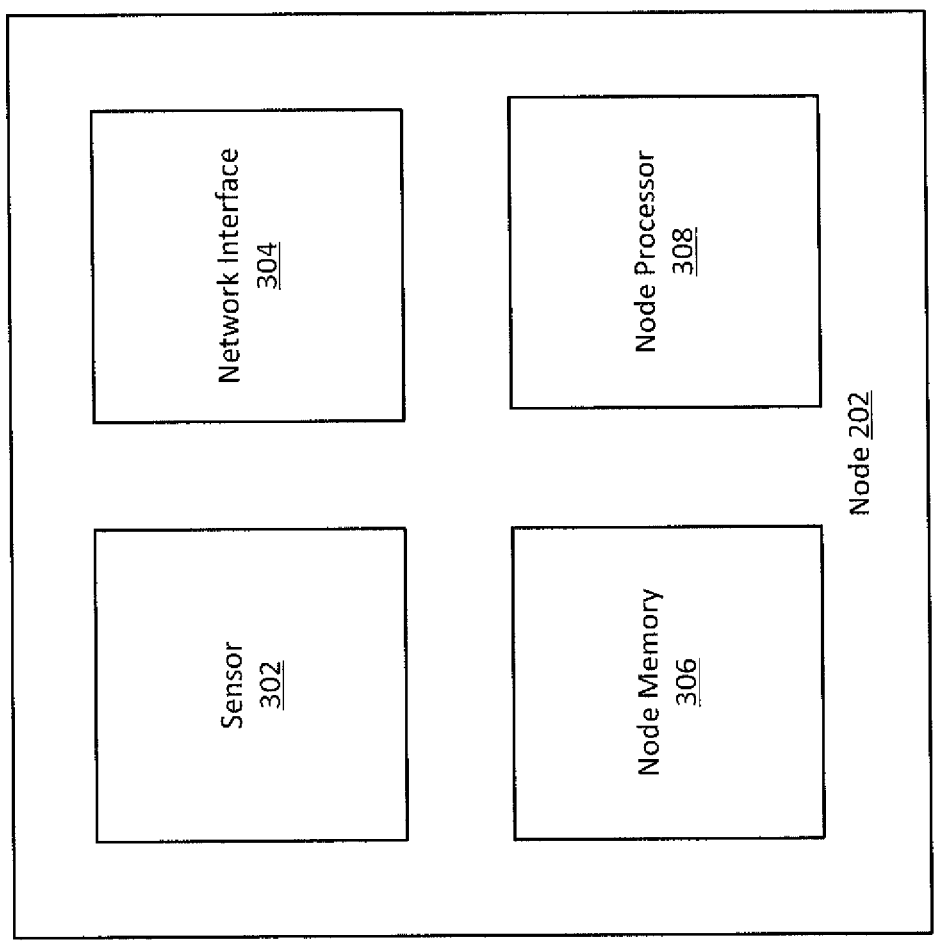

FIG. 3 shows a diagram in accordance with one or more embodiments of the invention. In one or more embodiments of the invention, the node (202) includes a sensor (302), a network interface (304), a node memory (306), and a node processor (308), each of which may be operably connected to each other. Each of these components is described further below.

In one or more embodiments of the invention, the node (202) includes a sensor (302). In one embodiment of the invention, the sensor (302) is capable of detecting a temperature reading and communicating that temperature reading. Temperature, as referred to in this application, is any measure of heat or lack of heat (e.g., actual temperature, estimated temperature, indication of rising temperature, indication of falling temperature, etc.). In one or more embodiments of the invention, the sensor is located within the network interface (304). In other embodiments of the invention, the sensor (302) is located within the node (202) but external to the network interface (304). For example, the sensor (302) may be found within the node processor (308) or node memory (306).

In one or more embodiments of the invention, the node (202) includes a network interface (304). The network interface (304) is capable of sending and/or receiving available data from components inside the node (202) (e.g., the sensor (302), the node memory (306), the node processor (308), etc.). In one or more embodiments of the invention, the network interface (304) is operably connected to the mesh network (214), and can send and/or receive available data to/from the mesh network (214). In one or more embodiments, the network interface (304) is operably connected to the transmission network (204), and can send and/or receive available data to/from the transmission network (204).

In one or more embodiments of the invention, the node (202) includes a node memory (306). In one embodiment, the node memory (306) may store available data for sending and/or receiving by the network interface (304). In one or more embodiments of the invention, the node memory (306) may store priority information associated with any available data contained in the node memory (306). In one or more embodiments of the invention, the node memory (306) includes one or more aspects of the functionality of the memory (104) of FIG. 1.

In one or more embodiments of the invention, the node (202) includes a node processor (308). In one or more embodiments of the invention, the node processor (308) may control the components within the node (202) (e.g., the sensor (302), network interface (304), node memory (306), etc.). For example, the node processor (308) may operate to receive a temperature reading from the sensor (302). In another example, the node processor (308) may operate to store available data in the node memory (206). In another example, the node processor may operate to retrieve data sent over the transmission network (204) or stored in the node memory (206). In one or more embodiments of the invention, the node processor (308) may determine priority information for certain subsets of available data. The node processor (308) may also compare priority information among certain subsets of available data. In one or more embodiments of the invention, the node processor (308) includes one or more aspects of the functionality of the computer processor(s) (102) of FIG. 1.

Figure 4:
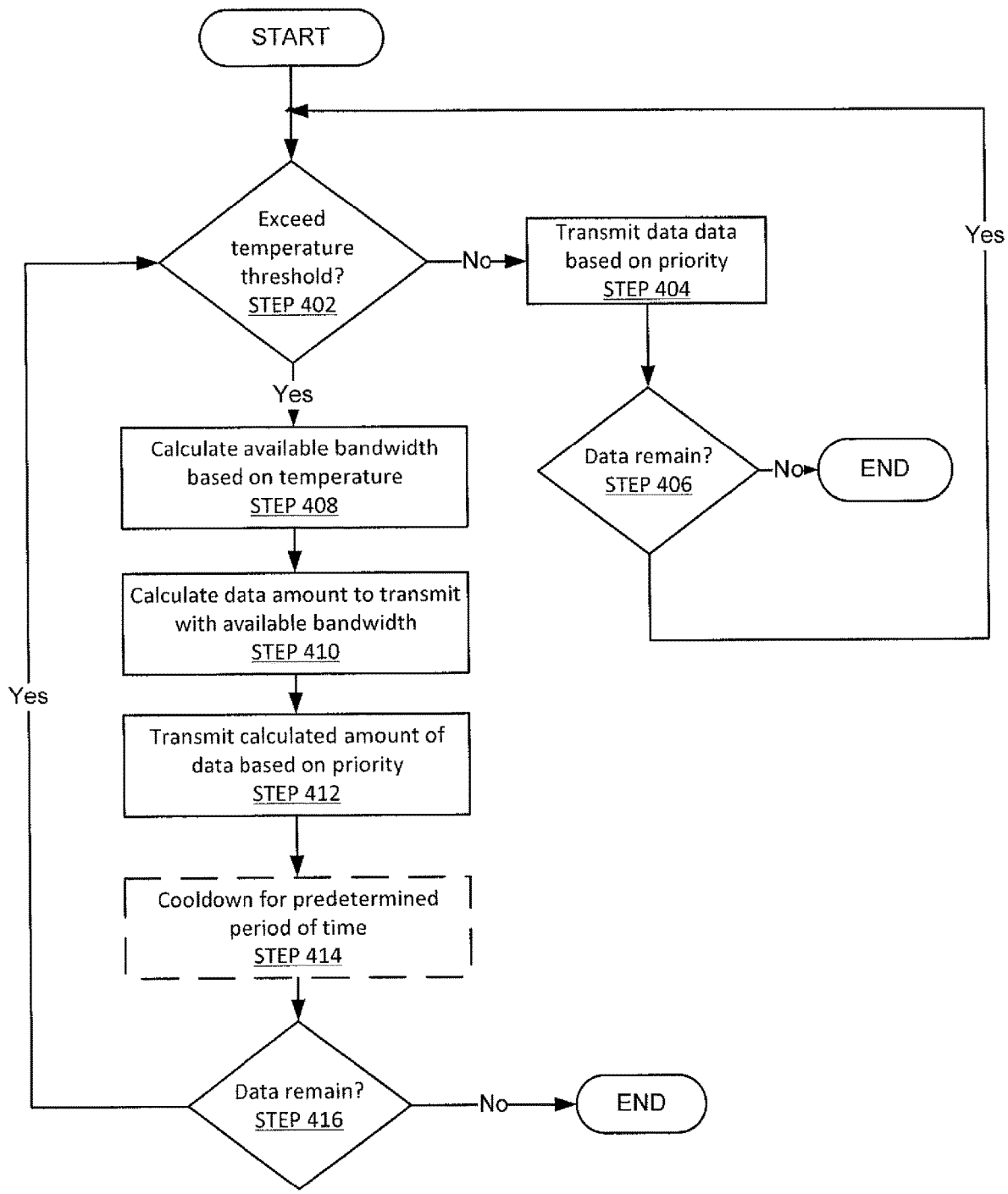
FIGS. 4-5 show flowcharts in accordance with one or more embodiments of the invention.

FIG. 4 shows a flowchart in accordance with one or more embodiments of the invention. The process shown in FIG. 4 may be executed, for example, by one or more components (e.g., node (202), server (206), etc.)) discussed above in reference to FIGS. 2A and 2B. One or more steps shown in FIG. 4 may be omitted, repeated, and/or performed in a different order among different embodiments. Accordingly, embodiments should not be considered limited to the specific number and arrangement of steps shown in FIG. 4.

Initially, a determination is made whether the temperature reading of a node exceeds a temperature threshold (STEP 402). This determination may use as input a reading taken from the sensor (e.g., a numerical temperature value, an indication that the temperature is rising, etc.). In one example, the determination is based on a temperature reading at the node. In another example, the determination is based on a temperature reading at the network interface. In another example, the determination is based on receiving a temperature reading at one or more components of the system (e.g., the server) via the transmission network. The determination may be made by one or more components of the system, such as the server or the node. Those skilled in the art, having the benefit of this detailed description, will appreciate that multiple techniques of determining a temperature reading may be used, and that this invention applies to such techniques. In one example, the determination is made by comparing a temperature reading with a threshold temperature set in advance of the determination. In another example, the determination is made by comparing a temperature reading containing a rate of change of the temperature with a threshold rate of change set in advance of the determination.

Although FIG. 4 shows only a single threshold, other embodiments of the invention may have multiple temperature thresholds. These thresholds may have been programmed by a manufacturer of one or more components of the system. Additionally or alternatively, these thresholds may be received over the mesh network or the transmission network and may be updated at any time.

In one embodiment of the invention, if the above determination (STEP 402) shows that the temperature reading has not exceeded a temperature threshold, in STEP 404 the node transmits available data based on the priority of the available data. Such transmission may take place at the initiation of a transmission by the node, or may take place in response to a request or command transmitted by server to the node via the transmission network. For example, the server may initiate a series of requests to the node over the transmission network to transmit available data, basing such requests on the priority of the available data.

In one or more embodiments of the invention, the priority of the available data is based on a predetermined value reflecting a subjective determination of the importance of each subset of available data. In one example, this priority is reflected by classifying a particular subset of available data as "high priority," "medium priority," or "low priority." Priority of the available data may be determined by one or more components of the system, such as the node or the server. Further, priority of the available data may also be associated with a request or a command from the server for the node to transmit a particular subset of the available data. For example, a request for a particular subset of available data reflecting a subjective determination of the importance of the requested subset of available data may also have a priority rating of "high priority," "medium priority," or "low priority." Priority may also be represented in numerical format. For example, a subset of available data with a lower relative importance may have a priority of 1, whereas a subset of available data with a higher relative importance may have a priority of 5. Those skilled in the art, having the benefit of this detailed description, will appreciate that multiple techniques of determining priority information associated with available data may be used, and that this invention applies to such techniques.

In one embodiment, the available data may be transmitted by the node or requested by the server in decreasing order of priority, with higher priority available data being transmitted/requested before lower priority available data. In another embodiment, only a certain level priority and above of available data may be transmitted by the node or requested by the server. In another embodiment, available data at or below a certain level priority (and/or requests for such available data) may be deleted or ignored by the node or server. One of ordinary skill in the art could, with the disclosure of this application, implement any number of priority schemes that are covered under one or more embodiments of the invention.

In one embodiment of the invention, if it is determined in STEP 406 that there is remaining available data to transmit, control proceeds back to STEP 402.

In one embodiment of the invention, if the determination in STEP 402 is affirmative, in STEP 408 the available duty cycle is calculated based on a temperature reading. In one or more embodiments of the invention, the duty cycle may be expressed as a measure of transmission time in relation to the idle time of a network interface. For example, the duty cycle may be expressed in terms 10 seconds of transmission time followed by 1 minute and 50 seconds of idle time. In another embodiment of the invention, the duty cycle may be expressed a measurement of bit-rate available for transmission of data via transmission network expressed in bits per second or multiples of it (bit/s, kbit/s, Mbit/s, Gbit/s, etc.).

The available duty cycle may be calculated by one or more components of the system, such as the node or the server. In one or more embodiments of the invention, a set of predetermined duty cycles is associated with a range of temperature readings, with a higher temperature generally corresponding to a lower duty cycle. For example, the node with a temperature reading of X may utilize a lookup table with X as a key to retrieve a duty cycle value of Y. In another example, the server with a temperature reading of Q may utilize a binary tree search with Q as a key to retrieve a duty cycle value of R. Although specific data structures are mentioned herein, one of ordinary skill the art will appreciate that any acceptable data structure capable of associating and retrieving a duty cycle given a temperature reading may be used. In one or more embodiments of the invention, the duty cycle may also be calculated as a function of the temperature reading.

In one or more embodiments of the invention, in STEP 410, the data amount to transmit with the available duty cycle is calculated. The data amount may be calculated by one or more components of the system, such as the node or the server. In one example, the available duty cycle was calculated to be a transmission time of 10 seconds with an idle time of 1 minute and 50 seconds. In this example, the embodiment may calculate an amount of available data that may be transmitted within the transmission time of 10 seconds. In another example, the available duty cycle was calculated to be a rate of 1000 bits/second. In this example, the embodiment may calculate an amount of available data that may be transmitted within the calculated rate of 1000 bits/second given known or estimated parameters within the system, such as expected transmission load, etc.

In one embodiment of the invention, in STEP 412, the calculated amount of available data is transmitted based on the priority of the available data. In one embodiment of the invention, the node transmits a subset of the available data not exceeding the amount calculated in STEP 410 based on the priority of the available data. Such transmission may take place at the initiation of a transmission by the node, or may take place in response to a request or command transmitted by server to the node via the transmission network. In one example, available data at or above a certain priority level is transmitted. In another example, available data at or above a certain priority level is transmitted, and any remaining capacity as calculated in STEP 410 is filled with available data of decreasing levels of priority until the remaining capacity is filled. In another example, available data at or below a certain priority level is ignored or deleted from the system. In another example, requests for available data at or above a certain priority level are transmitted from the server to the node via the transmission network, and the requested available data at or above a certain priority level is transmitted. In another example, requests for available data at or above a certain priority level are transmitted from the server to the node via the transmission network, the requested available data at or above a certain priority level is transmitted, and any remaining capacity as calculated in STEP 410 is filled with requests for available data with decreasing levels of priority until the remaining capacity is filled. In another example, requests for available data at or below a certain priority level are ignored or deleted from the system.

In one embodiment of the invention, there is an optional cooldown STEP 414. For example, if the available duty cycle as calculated in STEP 408 includes a transmission idle time (e.g., 1 minute and 50 seconds of transmission idle time after each 10 seconds of transmission time), the embodiment may cease transmission (i.e., idling) for the duration of the transmission idle time. In another embodiment, the network interface may power down for the duration of the transmission idle time.

In one embodiment of the invention, it is then determined in STEP 416 if there is remaining available data to transmit. If the determination is affirmative, the embodiment proceeds back to STEP 402.

Figure 5:
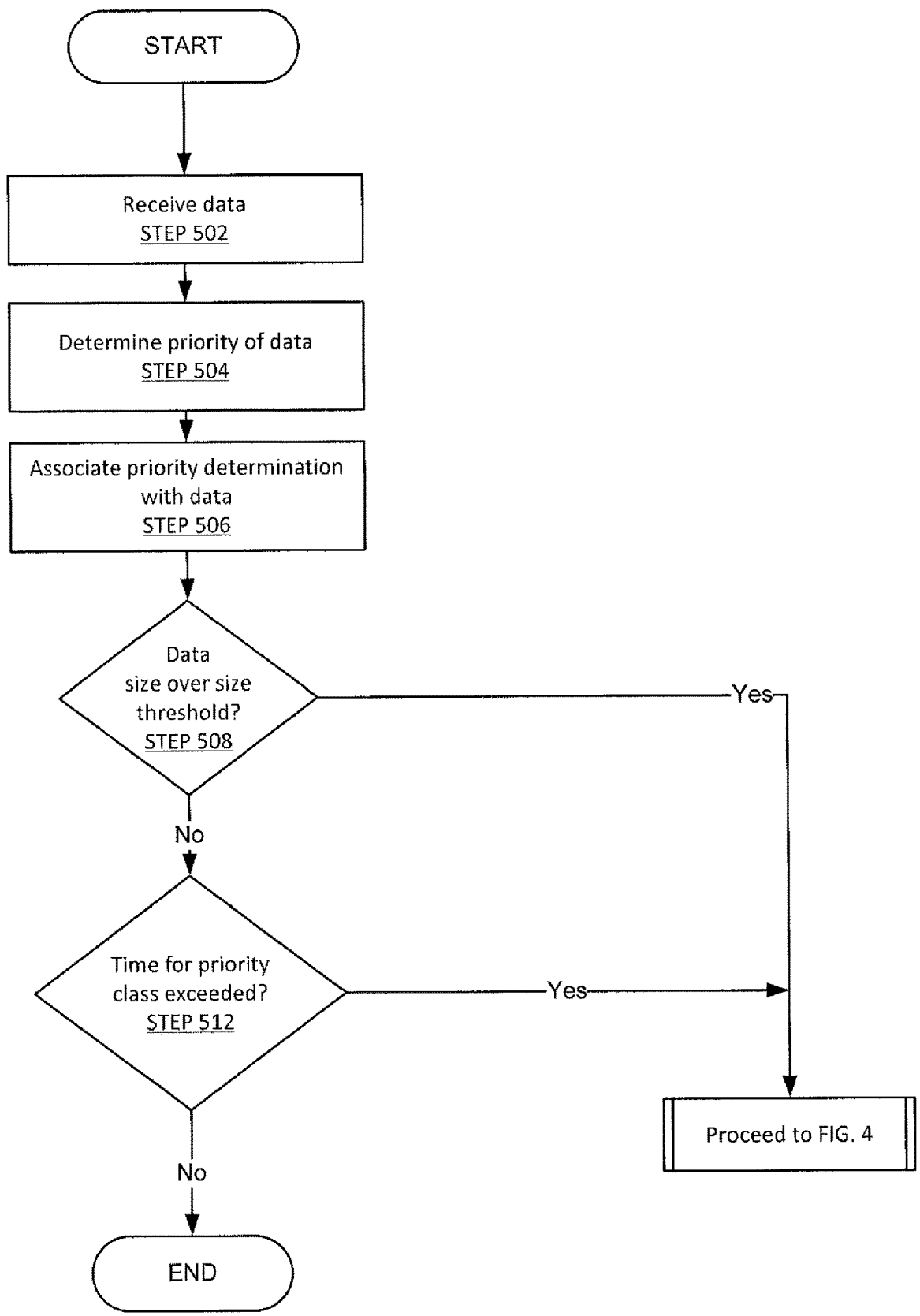

FIG. 5 generally shows a more detailed example of the embodiments of the invention disclosed in connection with FIG. 4. In one or more embodiments of the invention, the steps disclosed in FIG. 5 generally take place at the node.

In one or more embodiments of the invention, in STEP 502 the node receives available data to transmit. The available data may have come from within node, from hardware operatively connected to node, or from another node connected to node via a mesh network. Further, the available data may include different types of messages with different priority levels. For example, the available data may include a low priority status message, a high priority fault code, or any mixture of different subsets of available data with corresponding priority levels.

In one or more embodiments of the invention, in STEP 504 the node determines the priority of the available data. The node may make this determination based on looking up a predetermined priority value of each subset of available data; however one of ordinary skill in the art will be able to envision a range of prioritization schemes that may be applied to the available data and that are encompassed by one or more embodiments of the invention.

In one or more embodiments of the invention, in STEP 506 the node then associates the priority determination with the available data.

In one or more embodiments of the invention, in STEP 508 the node determines whether the total amount of available data to transmit is over a predetermined size threshold for transmission. The size threshold may have been programmed by a manufacturer of one or more components of the system. Additionally or alternatively, the size threshold may be received over the mesh network or the transmission network and may be updated at any time. If the determination is yes, then the embodiment proceeds to the process described in connection with FIG. 4.

If the determination in STEP 508 is negative, one or more embodiments of the invention proceed to STEP 512. In STEP 512, the embodiment may compare the time that each subset of available data was received in STEP 502 with a predetermined time threshold associated with the priority determination that was associated with the subset of available data in STEP 506. The time threshold may have been programmed by a manufacturer of one or more components of the system. Additionally or alternatively, the time threshold may be received over the mesh network or the transmission network and may be updated at any time. For example, the node may determine that a particular subset of available data has a priority of "high priority," that the time threshold for "high priority" data is 5 seconds, and that the particular subset of available data has not been transmitted in over 5 seconds. If the result of the determination in STEP 512 is yes, the embodiment proceeds to the process described in connection with FIG. 4.

Figure 6:
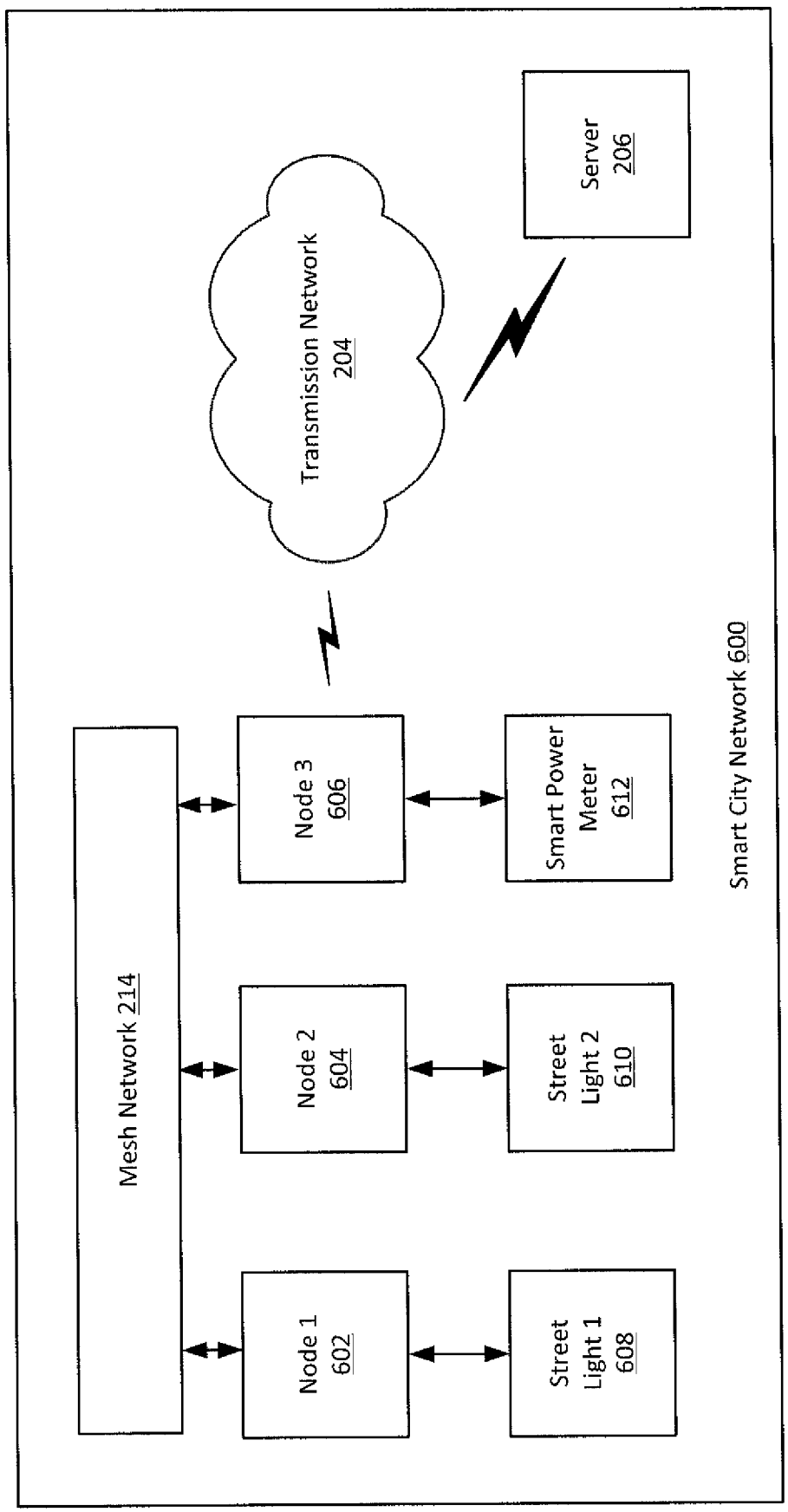
FIG. 6 shows an example schematic system diagrams in accordance with one or more embodiments of the invention.

FIG. 6 describes a smart city network (600) in accordance with one embodiment of the invention. The smart city network (600) includes a set of nodes (node 1 (602), node 2 (604), and node 3 (606)) connected to each other via a mesh network (214). Node 1 (602) is connected to street light 1 (608), node 2 (604) is connected to street light 2 (610), and node 3 (606) is connected to smart power meter (612) such that each connected pair can exchange data via a data exchange mechanisms (e.g., ZigBee, Bluetooth, Power Line Communication (PLC), WiFi, or similar protocol). (ZigBee is a registered trademark of ZigBee Alliance, Inc., San Ramon, Calif., USA. BLUETOOTH is a registered trademark of Bluetooth SIG, Inc., Kirkland, Wash., USA. WiFi is a registered trademark of Wi-Fi Alliance, Austin, Tex., USA). Further, according to one embodiment of the invention, node 3 (606) is connected to server (206) via the transmission network (204).

In this example, node 3 (606) may collect data from the smart power meter (612) for transmission to the server (206) via the transmission network (204). Node 3 (606) may collect different types of data from smart power meter (612) that have different levels of priority. For example, node 3 (606) may collect a power consumption reading from smart power meter (612) that is determined to be low priority. In another example, node 3 (606) may collect an error message from smart power meter (612) showing total failure of the meter that is determined to be high priority.

Node 3 (606) may also receive data intended for server (206) from node 1 (602) via the mesh network (214) that originated from street light 1 (608). Further, node 3 (606) may also receive data intended for server (206) from node 2 (604) via the mesh network (214) that originated from street light 2 (610). The data received at node 3 (606) that is intended for server (206) may be of differing levels of priority, for example a low priority ambient light reading originating from street light 1 (608) and a system malfunction message originating from street light 2 (610). Since node 3 (606) is operatively connected to server (206) via transmission network (204), in this example, node 3 (606) forwards the data from node 1 (602) and node 2 (604) to server (206) via transmission network (204) as if the data had originated at node 3 (606) or the smart power meter (612).

In one embodiment of the invention, node 3 (606) transmits available data received from smart power meter (612) and via the mesh network (214) from node 1 (602) and node 2 (604) based on the priority of the available data. In one example, node 3 (606) transmits available data at or above a certain priority level, such as only equipment failure notifications. In another example, node 3 (606) transmits available data in a decreasing order of priority, such as transmitting the equipment failure notifications before the ambient light readings and power consumption readings. In another example, node 3 (606) may disregard, ignore, or delete available data at or below a predetermined priority threshold.

In one or more embodiments, the smart city network (600) may seek to lower the operating temperature of node 3 (606) for more reliable and effective operation of both the node 3 (606) and the smart power meter (612). The temperature of node 3 (606) may be lowered calculating, using a temperature reading, a transmission duty cycle of node 3 (606), calculating a data amount capable of being transmitted with the transmission duty cycle, and transmitting, from a network interface (304) of node 3 (606), a plurality of available data at a rate less than the data amount based on the priority of the plurality of the available data.

According to one embodiment of the invention, the embodiment may act to cool node 3 (606) for a predetermined period of time to lower the temperature of node 3 (606). For example, node 3 (606) may transmit available data to server (206) via transmission network (204) for one predetermined period of transmission time (K), then enter into an idle period where no available data is transmitted for another predetermined period of time (L). In this example, further cooling of node 3 (606) may be achieved by decreasing K and/or increasing L. In another example, should the temperature of node 3 (606) fall to a desired degree, the rate of transmission of available data may be increased by increasing K and/or decreasing L.

According to another embodiment of the invention, the temperature of node 3 (606) may be reduced by reducing the amount of available data for transmission, as reducing the quantity of data transmitted reduces the heat generated from such transmission. Such a reduction may be achieved in multiple ways. For example, the node 3 (606) may transmit available data based on the priority of the available data as described herein. For example, node 3 (606) may transmit only available data with a certain priority level or higher via the transmission network (204) to the server (206), which reduces or eliminates the heat generated from the transmission of lower priority available data. Alternatively, node 3 (606) may transmit data in decreasing order of associated priority level. In another example, node 3 (606) may delete or ignore available data with an associated priority level at or below a predetermined priority level.

According to another embodiment of the invention, the temperature of node 3 (606) may be reduced by reducing the rate at which the available data is transmitted via the transmission network (204) to the server (206). A reduction of the transmission rate may reduce the total heat generated from the transmission of the available data, and may reduce the temperature of node 3 (606).

According to another embodiment of the invention, in this example, available data from node 3 (606) may only be sent to server (206) in response to a command or request sent from server (206) to node 3 (606). For example, server (206) may transmit a request to node 3 (606) via transmission network (204) requesting any equipment failure notifications, or alternatively requesting any ambient power readings.

Further, in this example, node 3 (606) may transmit temperature readings containing an indication of the temperature of node 3 (606) to server (206). In this instance, server (206) has a temperature reading of node 3 (606), Should server (206) deem it useful to lower the temperature of node 3 (606), server (206) can base the requests or commands for data on the priority of the requested or commanded data. For example, should a temperature reading from node 3 (606) indicate that the temperature is above a certain threshold (e.g., node 3 is above 40 degrees Celsius), server (206) can modify the commands or requests sent to node 3 (606) in a similar manner to the transmission based on the priority of available data that was discussed herein with respect to node 3 (606).

In another example, should a temperature reading from node 3 (606) indicate that the temperature is above a certain threshold (e.g., node 3 is above 40 degrees Celsius), server (206) can instruct node 3 (606) to begin cooling for a predetermined period of time in one of the manners described herein.

In this example, the transmission of available data based on the priority of the available data as described herein may be combined with one or more examples of reducing the temperature of a specific node. Listing specific combinations in no way is meant to limit the invention to those specific examples.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for controlling thermal properties of a node, comprising:
    calculating, using a temperature reading, a transmission duty cycle of the node, wherein the transmission duty cycle is a measure of transmission time relative to idle time of the node;
    calculating a data amount capable of being transmitted with the transmission duty cycle; and
    transmitting, from a network interface of the node, a plurality of available data at a rate less than the data amount based on a priority of the plurality of available data.

2. The method of claim 1, further comprising:
    receiving the plurality of available data;
    determining the priority of the plurality of available data; and
    associating the priority with the plurality of available data.

3. The method of claim 1, further comprising:
    cooling the node for a predetermined period of time.

4. The method of claim 3, further comprising:
    increasing the predetermined period of time for cooling the node.

5. The method of claim 3, further comprising:
    powering down the network interface of the node.

6. The method of claim 3, further comprising:
    idling the network interface of the node.

7. The method of claim 1 wherein transmitting the plurality of available data further comprises:
    transmitting available data above a minimum priority.

8. The method of claim 1, wherein transmitting the plurality of available data further comprises:
    transmitting available data in a decreasing order of priority.

9. The method of claim 1, wherein the network interface is a cellular modem.

10. The method of claim 1, wherein the network interface is operatively connected to a mesh network.

11. A system for controlling thermal properties of a node, comprising:
    a transmission network; and
    a server and the node operatively connected to the server via the transmission network, wherein the node comprises a first processor configured to:
    calculate, using a temperature reading, a transmission duty cycle of the node, wherein the transmission duty cycle is a measure of transmission time relative to idle time of the node;
    calculate a data amount capable of being transmitted with the transmission duty cycle; and
    transmit, from a network interface of the node, a plurality of available data at a rate less than the data amount based on a priority of the plurality of the available data.

12. The system of claim 11, wherein the first processor is further configured to: receive the plurality of the available data; determine the priority of the plurality of the available data; and
    associate the priority with the plurality of the available data.

13. The system of claim 11, the first processor is further configured to:
    cool the node for a predetermined period of time.

14. The system of claim 11, further comprising:
    a second processor configured to: calculate, using the temperature reading, the transmission duty cycle of the node;
    calculate the data amount capable of being transmitted with the transmission duty cycle; and
    transmit, from the network interface of the node, the plurality of available data at a rate less
    than the data amount based on the priority of the plurality of the available data.

15. The system of claim 11, wherein the second processor is further configured to:
    cool the node for a predetermined period of time.

16. The system of claim 11, wherein the node and the server are connected via a cellular data network.

17. The system of claim 11, further comprising:
    a second node connected to the node.

18. The system of claim 17, wherein the second node is connected to the node via a mesh network.

19. A non-transitory computer readable medium comprising instructions which, when executed by one or more hardware processors, causes the one or more hardware processors to perform operations to:
    calculate, using a temperature reading, a transmission duty cycle of the node, wherein the transmission duty cycle is a measure of transmission time relative to idle time of the node;
    calculate a data amount capable of being transmitted with the transmission duty cycle; and
    transmit, from a network interface of the node, a plurality of available data at a rate less than
    the data amount based on the priority of the plurality of the available data.

20. The non-transitory computer readable medium of claim 19, wherein the one or more hardware processors further perform operations to:
    receive the plurality of the available data;
    determine the priority of the plurality of the available data; and
    associate the priority with the plurality of the available data.

* * * * *